Sept. 6, 1927.
J. A. REECE
1,641,932
METHOD AND APPARATUS FOR MAKING WIRE GLASS
Original Filed March 19, 1921
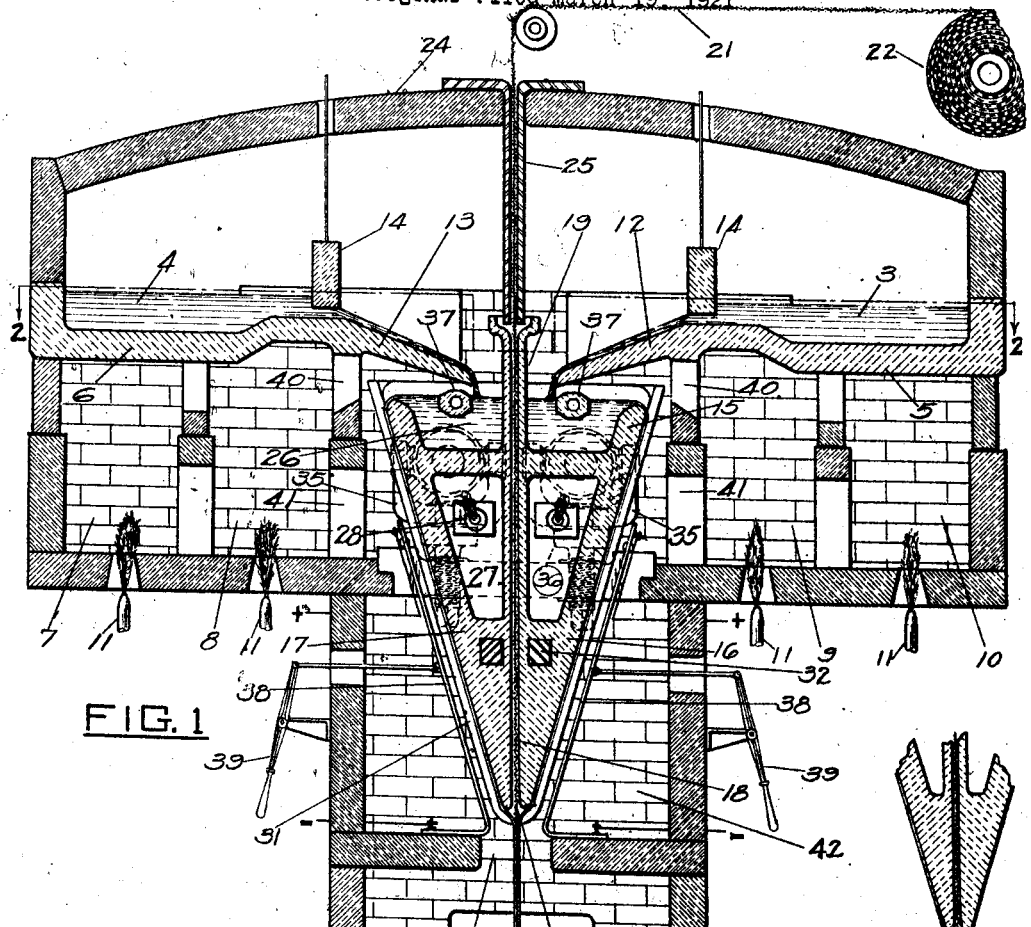
FIG.1
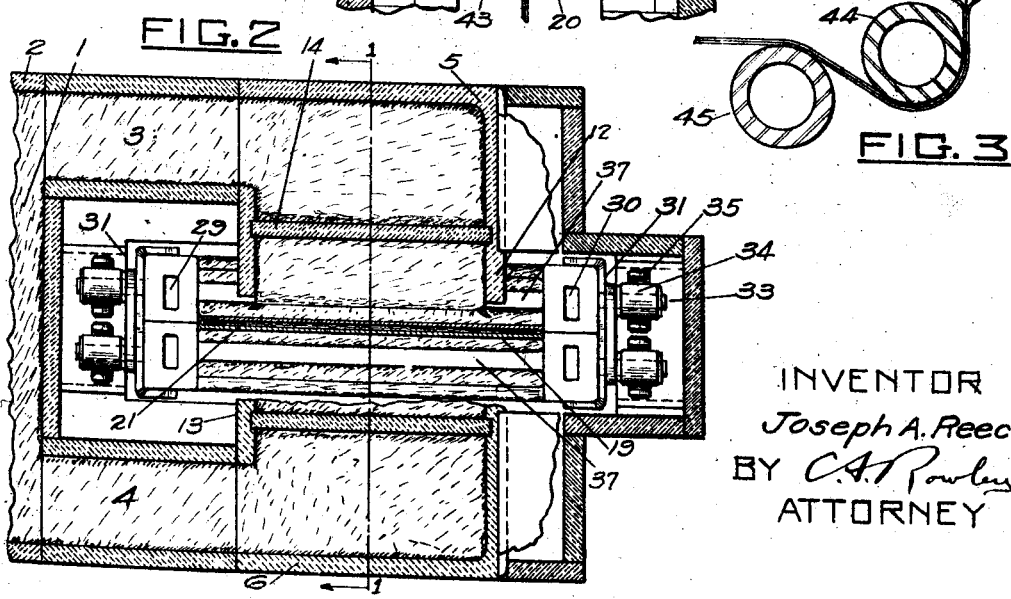
FIG.2
FIG.3
INVENTOR
Joseph A. Reece
BY C. A. Rowley
ATTORNEY Patented Sept. 6, 1927.

1,641,932

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR MAKING WIRE GLASS.

Application filed March 19, 1921, Serial No. 453,704. Renewed January 12, 1925.

The invention here disclosed relates to a new process for producing wire glass or sheet glass having wire mesh enclosed therein, and to an apparatus for accomplishing this process.

The invention has for its object, broadly, to continuously and simultaneously flow molten glass onto the two faces of a sheet of wire mesh, in such a way that the wire mesh will be confined centrally within the resulting sheet of glass. In the form of the invention here shown, the wire mesh is moved continuously downward and the molten glass is flowed onto the two sides of the sheet from a fixed container. This container is so formed and arranged that the molten glass flows down the outer faces thereof and into the sheet, with the outer surfaces of the flowing glass forming the outer surfaces of the sheet. In this way no solid objects or materials touch the glass forming the outer surfaces of the sheet, from the time it leaves the molten source until the sheet is formed and set. A sheet is thus formed devoid of surface mars or scratches, and having a fine fire-polished surface. Furthermore the apparatus has practically no moving parts, the entire structure being substantially fixed, except for occasional adjustments, thus avoiding much wear and consequent necessity for replacements, usual where constantly moving parts are operated in the presence of great heat.

Further objects and details of the invention will become apparent from the following detailed description taken in connection with the accompanying drawings.

In the drawings:

Fig. 1 is a vertical transverse section through the apparatus, taken substantially on the line 1—1 of Fig. 2.

Fig. 2 is a partial plan view and horizontal section on the line 2—2 of Fig. 1, portions being broken away.

Fig. 3 is a detail view illustrating a method for bending the finished sheet into a horizontal plane.

The molten glass 1, flows continuously from a suitable source, such as a continuous tank furnace, the discharge end of which is indicated at 2. From this source, the glass flows in two streams 3 and 4 into opposite shallow receptacles 5 and 6, beneath which are heating chambers 7, 8, 9 and 10, heated, for example, by burners such as 11. The molten glass flows from the receptacles 5 and 6, through facing overflow spouts 12 and 13, the volume of the flow down these spouts being regulated by the adjustable gates or shear-cakes 14.

These streams of molten glass flow into the similar opposite compartments of a wedge-shaped container 15. This container 15 is formed of two similar halves 16 and 17, preferably of refractory material such as fireclay, which, when jointed together, form a rather large wedge or slab, with the edge at the bottom and the heel portion uppermost.

Between the two halves of the container, is left a narrow vertical slot or passage 18, almost the full width of the wedge, and passing downwardly through the extension 19 above the center of the heel of the wedge, and emerging through the lower edge portion of the wedge at 20. A sheet of wire mesh 21, is drawn downwardly through this slot 18. As here illustrated, this wire mesh is drawn from a suitably located supply roll 22, over a guide roll 23, and down through the roof 24 of the drawing chamber, into and through the slot 18. A suitable shielding casing 25, of refractory material or of suitable heat resisting metal such as nichrome, projects down from the roof and joins loosely with the slotted extension 19 of the container, the wire mesh first passing down through this casing, and thus being protected, in a measure, from the heated gases above the molten glass.

Each half of the container 15 comprises an upper glass containing receptacle 26, beneath which is an enclosed heating chamber 27. These chambers are heated by burners 28 at one end, air being drawn in through ports 29 and out through ports 30. The two halves of the container are carried at their ends by metallic end-plates or brackets 31, and by connecting bars 32, extending through the lower portions of the containers from end to end. A pair of trunnions 33 project from each end-plate, and are carried in swinging bearings 34, mounted in yokes 35, at the upper ends of supporting screws 36. By adjusting one or more of these screws 36, the container may be tilted in any desired direction, so that the glass will overflow from receptacles 26 in even and equal streams.

Extending from end to end of the container, above the receptacles 26, are skimmers 37, the molten glass flowing in form the spouts 12 and 13, behind these skimmers, and being forced to flow thereunder before it overflows at the sides of the container. This molten glass flows down the outer gently tapering sides of the container, until the two streams of films unite at the lower edge of the wedge or directing member, where they flow simultaneously onto the wire mesh from opposite sides.

In order to maintain the molten glass at the necessary fluid consistency to flow down the container walls, and still adhere thereto, its temperature is regulated by the heating chambers 27 within the wedge, and also by the electric heaters, shown conventionally at 38, located outside and parallel with the flowing streams of glass. The exact position of these heaters may be regulated by suitable means, such as the levers 39 here illustrated.

The heating chambers 8 and 9 function not only to heat the glass in the receptacles 3 and 4, but also the molten glass in receptacle 26, and the streams overflowing therefrom, the hot gases being deflected out through ports 40 and 41 for this purpose. The entire chamber 42, enclosing the wedge shaped container, is maintained at a high temperature, but after the sheet of wireglass has been formed by the streams uniting upon the wire mesh, the sheet passes out of chamber 42, through slot 43, into the cooler atmosphere, where it will become formed and set, although it may be, and preferably is, subjected to a subsequent annealing process. The sheet is drawn away from below by any desired form of pulling mechanism.

It will be noted that this apparatus, when properly adjusted, has no moving parts, and the operation is simple and continuous. The glass which goes to form the outer faces of the sheet, contacts with nothing, except the surrounding heated atmosphere, at any point after leaving the original container until the sheet is formed and set. In this way the possibility of marring or scratching the sheet is eliminated, and it will be formed with a finely fire polished surface on both sides.

In Fig. 3 is illustrated a method whereby the sheet while still sufficiently plastic may be deflected beneath a cooled bending roll 44, and over a second cooled roll 45, into the horizontal plane, if it be desired to handle the finished sheet in that plane.

Claims:

1. The method of making wire-glass, by drawing a sheet of wire-mesh downwardly, and flowing a stream of molten glass evenly and continuously from a pool of molten glass onto each face of the wire mesh, the exposed surface of each stream flowing from the exposed surface of the pool without touching any solid bodies till after it has formed an outer surface of the glass sheet.

2. The method of making wire-glass, by drawing a sheet of wire-mesh downwardly, and flowing a stream of molten glass evenly and continuously from a pool of molten glass onto each face of the wire mesh, there being a continuous exposed glass surface extending from the surface of the pool into the outer surface of the glass sheet, without touching any solid bodies.

3. In an apparatus for producing wire-glass, a wedge shaped container having a substantially vertical longitudinal slot therethrough, means for feeding a sheet of wire mesh downwardly through the slot so that it emerges at the lower edge of the wedge, means to supply molten glass to the upper portion of the container, the molten glass overflowing down the sides of the wedge onto the faces of the sheet of wire mesh.

4. In an apparatus for producing wire-glass, a wedge shaped container having a substantially vertical longitudinal slot therethrough, means for feeding a sheet of wire-mesh downwardly through the slot so that it emerges at the lower edge of the wedge, means to supply molten glass to the upper portion of the container, the molten glass overflowing down the sides of the wedge onto the faces of the sheet of wire mesh, and heating means within the container.

5. In an apparatus for producing wire-glass, a wedge shaped container having a substantially vertical longitudinal slot therethrough, means for feeding a sheet of wire-mesh downwardly through the slot so that it emerges at the lower edge of the wedge, means to supply molten glass to the upper portion of the container, the molten glass overflowing down the sides of the wedge onto the faces of the sheet of wire mesh, the lower portion of the container being hollow, and burners therein for heating the wedge and molten glass carried thereby.

6. In an apparatus for producing wire-glass, a wedge shaped container having a substantially vertical longitudinal slot therethrough, means for feeding a sheet of wire-mesh downwardly through the slot so that it emerges at the lower edge of the wedge, means to supply molten glass to the upper portion of the container, the molten glass overflowing down the sides of the wedge onto the faces of the sheet of wire-mesh, heating means within the container, and heaters outside the wedge for applying heat to the streams of molten glass as they flow down the wedge.

7. In an apparatus for producing wire-glass, a wedge shaped container having a substantially vertical longitudinal slot therethrough, means for feeding a sheet of wire-mesh downwardly through the slot so that it emerges at the lower edge of the wedge, means to supply molten glass to the upper portion of the container, the molten glass overflowing down the sides of the wedge onto the faces of the sheet of wire mesh, and electric heaters outside the wedge for applying heat to the streams of molten glass as they flow down the wedge.

8. In an apparatus for producing wire-glass, in combination, a source of molten glass, a wedge shaped container having a substantially vertical longitudinal slotted partition extending from top to bottom thereof, means for feeding a sheet of wire mesh down through the slot so that it emerges at the lower edge of the wedge, means for flowing a measured stream of molten glass to the container at each side of the partition, the molten glass overflowing down the sides of the wedge onto the faces of the sheet of wire-mesh, heating means within the container, and heating means outside the wedge for applying heat to the streams of molten glass as they flow down the wedge.

9. In an apparatus for producing sheet-glass, a member having downwardly converging sides, means for flowing molten glass down these sides to unite at the lower edge of the member and form the sheet, and electric heaters positioned substantially parallel to the converging sides for heating the streams of glass as they flow down the member.

10. In an apparatus for producing sheet-glass, a member having downwardly converging sides, means for flowing molten glass down these sides to unite at the lower edge of the member and form the sheet, electric heaters positioned substantially parallel to the converging sides for heating the streams of glass as they flow down the member, and means for adjusting the heaters toward or from the member.

11. In an apparatus for producing wire-glass, a member having downwardly converging sides and a central slot, means for feeding wire mesh downwardly through the slot, means for flowing molten glass down the converging sides onto the wire mesh to form the glass sheet, and electric heaters positioned substantially parallel to the converging sides for heating the streams of glass as they flow down the member.

Signed at Toledo, in the county of Lucas and State of Ohio, this 15 day of March, 1921.

JOSEPH A. REECE.